May 30, 1967 W. R. BERTELSEN 3,322,223
GROUND EFFECT MACHINES
Filed May 16, 1963 6 Sheets-Sheet 5
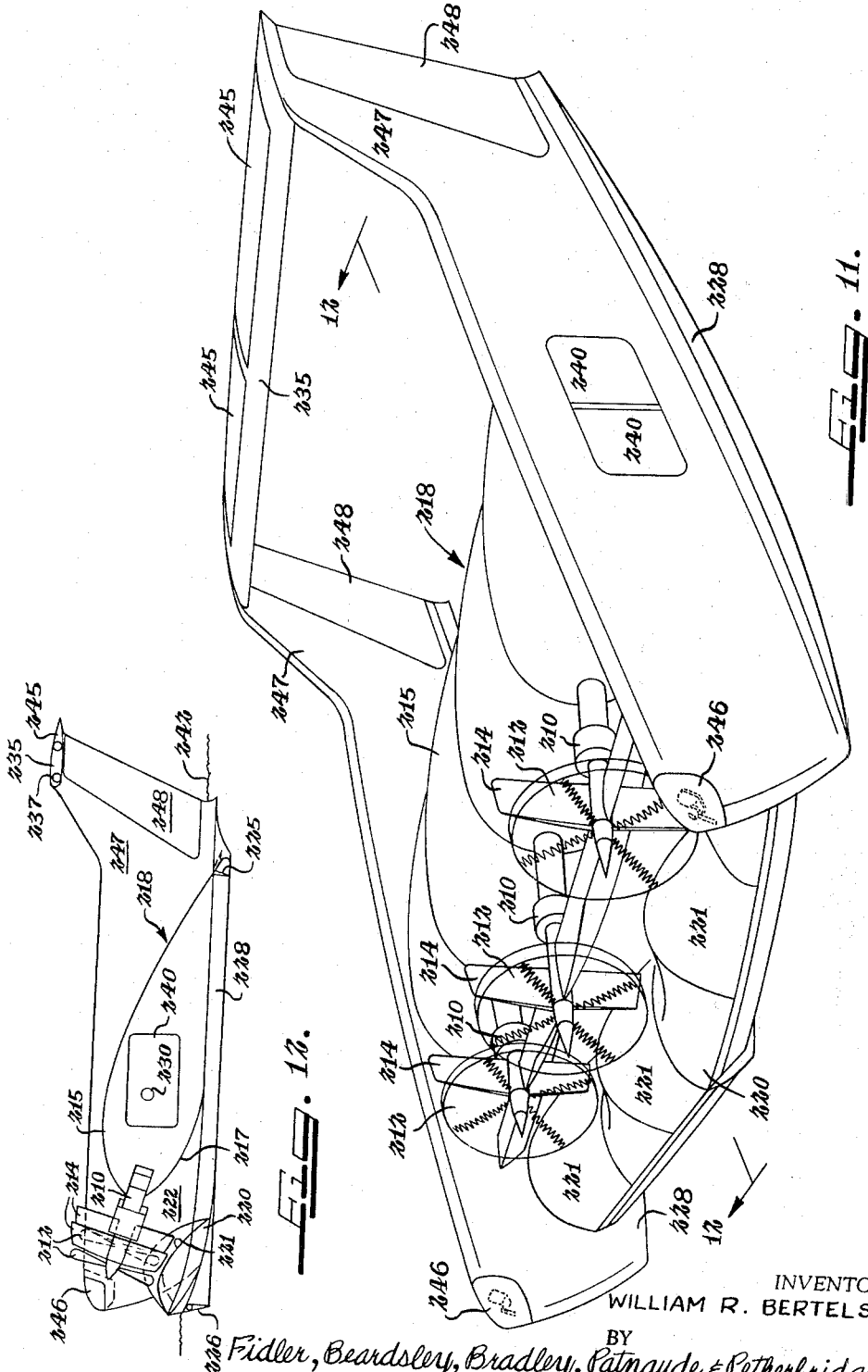
INVENTOR.
WILLIAM R. BERTELSEN
BY
Fidler, Beardsley, Bradley, Patnaude & Petherbridge
Attys.

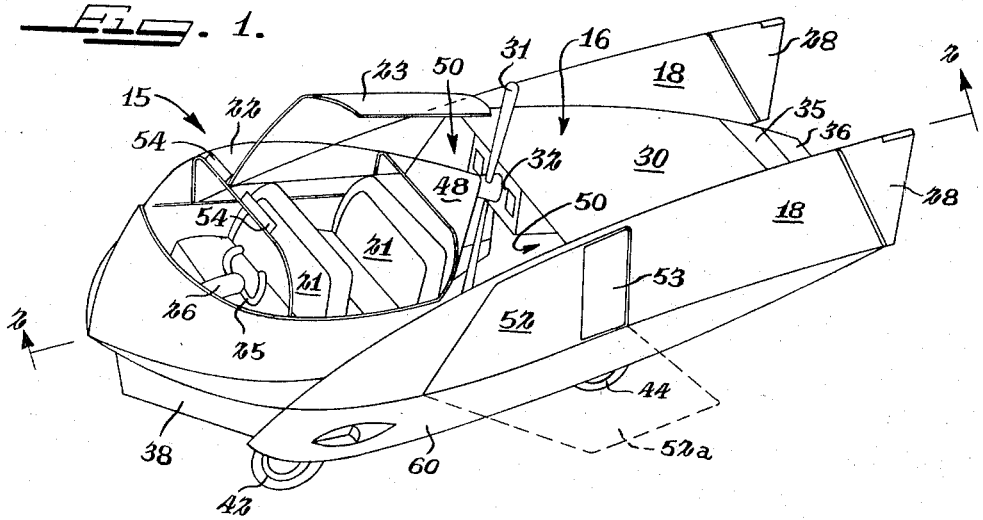

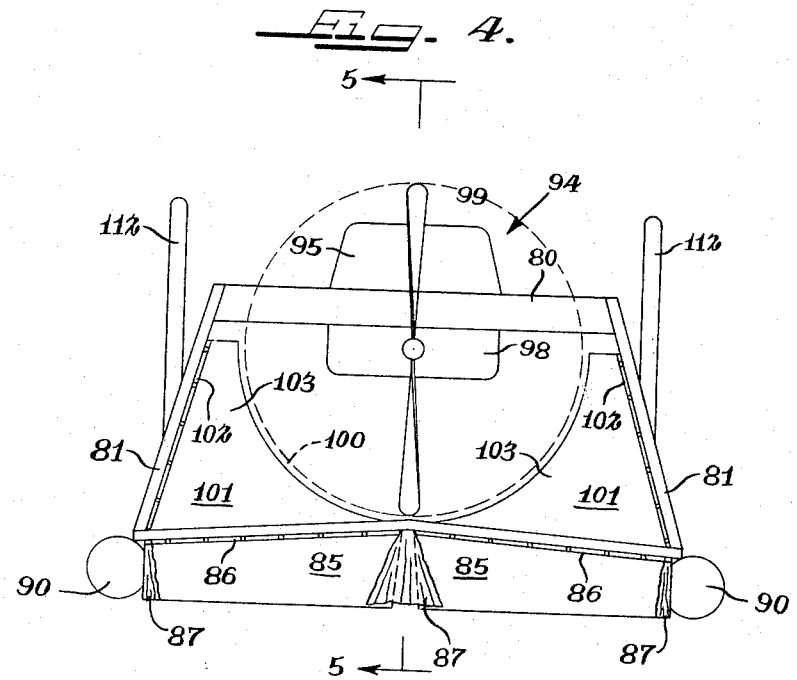
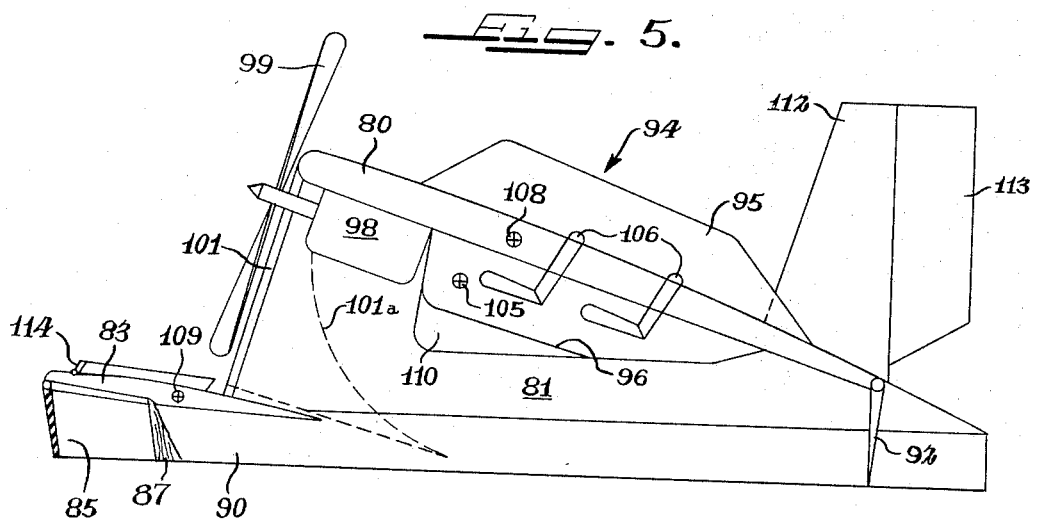

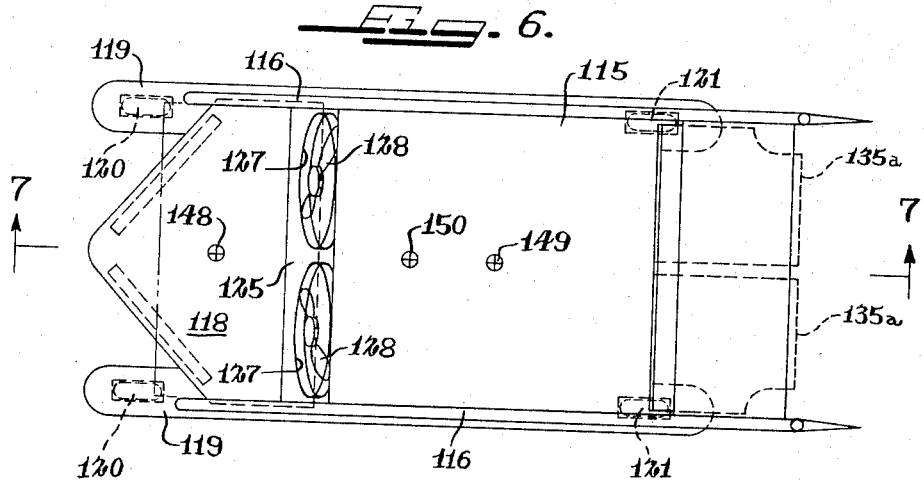
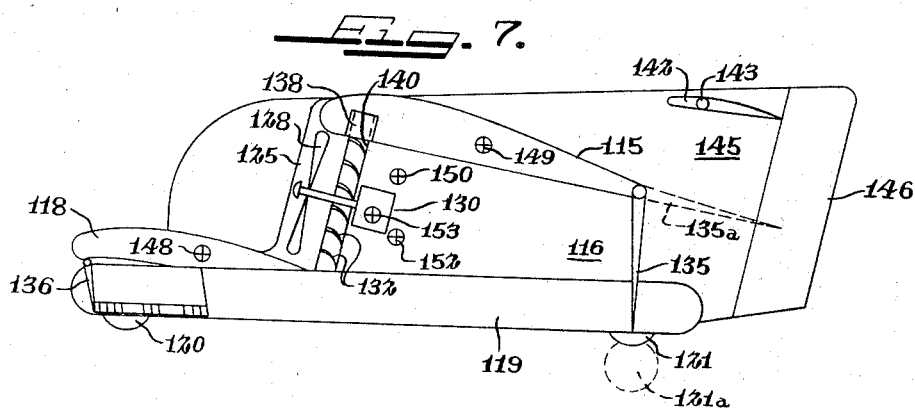
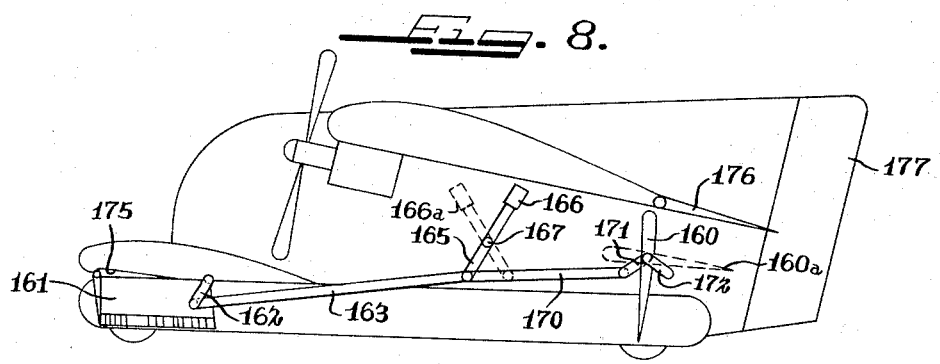

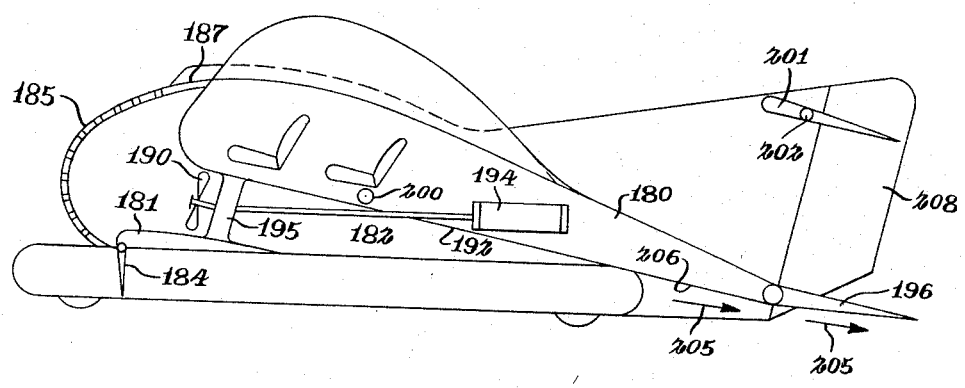
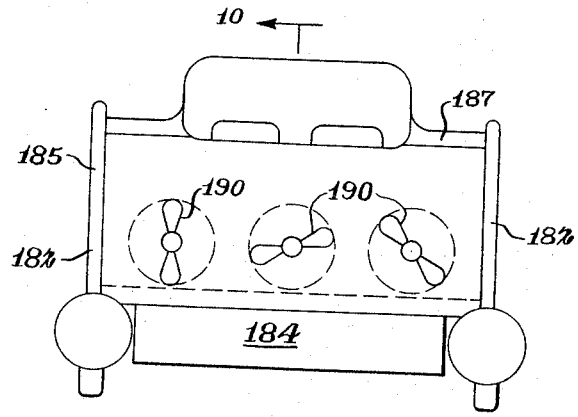

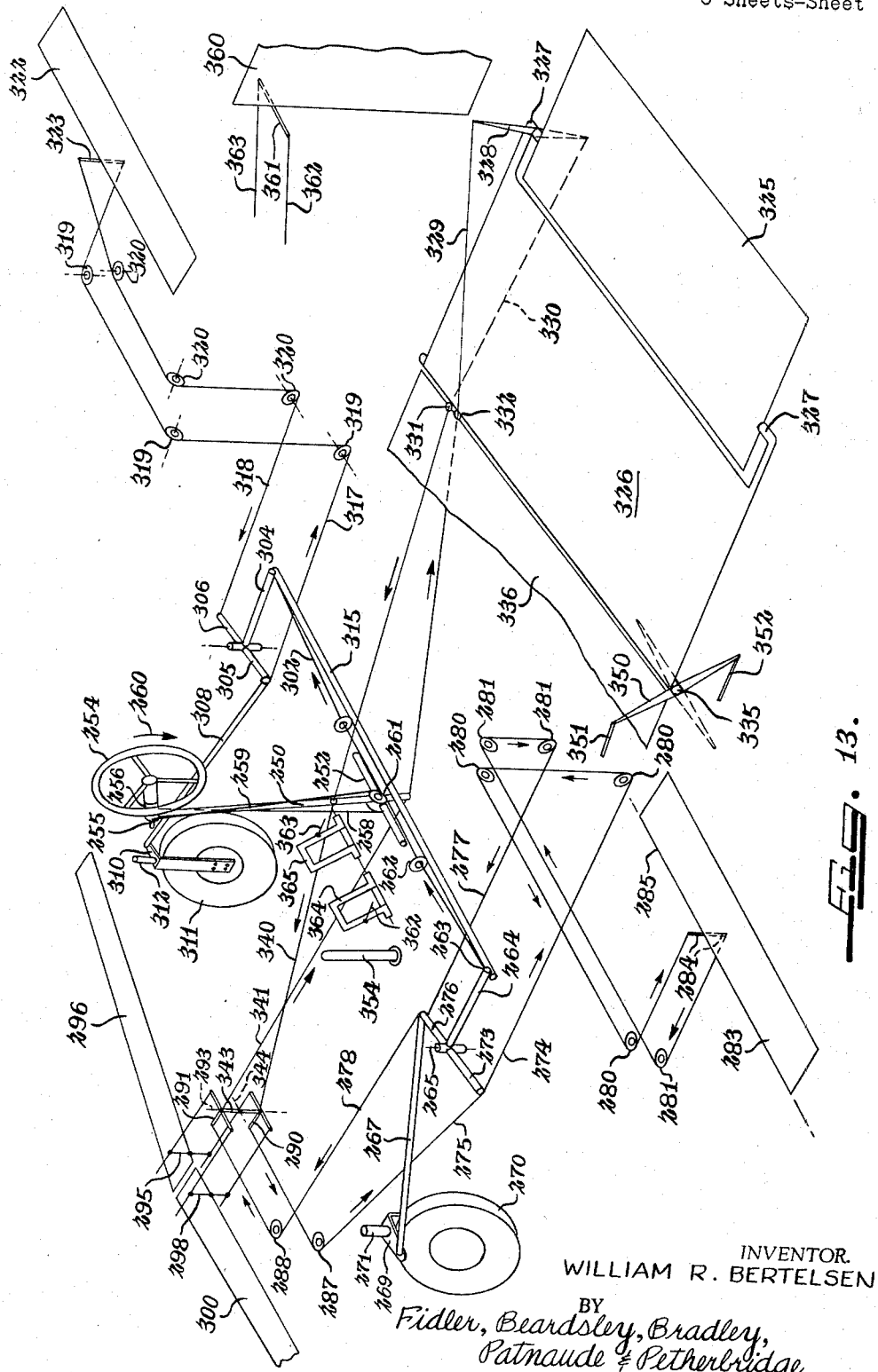

United States Patent Office 3,322,223
Patented May 30, 1967

3,322,223
GROUND EFFECT MACHINES
William R. Bertelsen, 113 Commercial St.,
Neponset, Ill. 61345
Filed May 16, 1963, Ser. No. 280,948
5 Claims. (Cl. 180—7)

The present invention relates broadly to aircraft, and more particularly to ground effect machines which are operated upon a cushion of air momentarily entrapped between the machine and the surface over which the machine travels; and is related in some respects to my copending applications Serial Nos. 125,005, 731,001, and 384,290, the latter application being abandoned.

Ground effect machines have employed blowers and propellers and the like to activate a mass of air and deliver same below the machine to create a pressurized blanket of air below the machine to sustain same in hovering and flight over the ground. Some machines have been heretofore proposed for traveling at high speed adjacent the ground. It has been found, however, when these machines are equipped with airfoil parts, that as the craft gains speed there is a change-over from aerostatic support to aerodynamic support accompanied by a shift in the effective center of lift. The direction of this shift is forward to cause a pitch-up moment to act on the craft tending to up-end same. Such shift in pressure can occur very suddenly and the normal reaction of the operator in pushing the stick forward may not be soon enough to counteract same. It is further difficult to control such condition because the prior machines have beeen geometrically proportioned so that the center of lift due to ground effect is substantially rearward of the aerodynamic center of lift, which latter center becomes effective at relatively high speed.

Such tendency to pitch-up is believed to be indicative of a greater load carrying capacity at high speed, wherein aerodynamic and ram air forces exist, than at low speed when substantially only aerostatic forces are significant for sustentation. This tendency appears to be further indicative of the ability of such ground effect machines to travel at substantially higher clearance over terrains than heretofore thought practicable while still carrying loads beyond the capabilities of conventional aircraft, including helicopters. It is proposed herein to provide structure for controlling this tendency and using the increased lift indicated for causing a ground effect machine to operate with a predetermined load at high speed and at a greater altitude than prior machines of the general kind. At lower loads this machine can operate above ground effect, and with higher loads same will operate at a lower elevation in ground effect.

Accordingly, the present invention is directed to a mechanism correcting the above shortcomings and provides a ground effect machine that can hover at low speeds as well as operate at high speeds. The craft is substantially a biplane construction, however, one modification shows a ducted structure which is in effect a relatively thick cord monoplane and having boundary layer control for further augmenting aerodynamic lift.

The ground effect machines to be described below have a common broad feature of so-controlling the aerodynamic and aerostatic forces that the center of lift and the center of gravity of the craft remain substantially in vertical alignment for both low and high speed operation thereof. The craft comprises movable parts which change the effective plan area acted on by static pressure to cause the area to have a center of static pressure substantially in registry with the center of lift of the machine. In addition to the above, automatically operated duct outlet forming valves or flaps are utilized to control the static pressure force relationship at low speeds, which valves are aerodynamically actuated upon attainment of high speed to cause aerodynamic forces to be exerted at substantially the same effective position as the aerostatic forces.

The machines to be described more in detail below, each provide thrust producing propellers and the same propellers provide pressurized air for operating in the ground effect areas or ranges of operation. The machines further are adapted to carry relatively large pay loads by utilizing the ground effect, both at high and low speeds and augmenting this force by a ram air effect at high speeds. It has been found that relatively thick airfoils that are shrouded can carry larger loads by using ground effect.

The height at which such machines operate most favorably is directly related to their size, and this height is usually referred to as a percentage of the outlet duct diameter. Using a relatively rectangular duct this function is modified apparently with regard to duct dimension and in the machines to be described is the width of same. Each of the machines has an aspect ratio less than one, although the invention is not thus limited. However, it is preferred that the machines be relatively long with respect to width because the pitch and yaw controls can thus be spaced farther from the centers of gravity and lift of the machine to effect better control.

Each of the modifications of the machine to be described below has flaps or the like adjacent the rear of the rearwardly extended wing which flaps are brought down so that the trailing edges lie approximately in the plane of the front valves or flaps and the depending sides of the machine to complete the duct by forming a rear-edge outlet thereof.

Accordingly, it is a broad object of this invention to provide a ground effect machine adapted for high speed flight with positionable valves or the like for controlling the shape of the duct outlet to maintain the centers of lift of the machine in substantially the same position in both low and high speed flight.

It is another object of the invention in keeping with the above object to provide manual or automatic control mechanisms for shaping and positioning the outlet of the duct.

It is a further object of the invention to adapt a ground effect machine for high speed flight over a support surface and augmenting ground effect by ram-wing effect whereby to support a larger load.

The foregoing and other objects and advantages of the invention will be either obvious or pointed out in the following specification and claims when read in view of the followng drawings of which:

FIG. 1 is a perspective view of a presently preferred embodiment of my invention, FIG. 2 is a sectional view taken on lines 2—2 of FIG. 1, FIG. 3 is a partial front view of a modification of the invention of FIG. 1 showing extended wings.

FIG. 4 is a front view of a modification of the invention,

FIG. 5 is a sectional view taken on lines 5—5 of FIG. 4,

FIG. 6 is a plan view of a modification of the invention,

FIG. 7 is a sectional view taken substantially on lines 7—7 of FIG. 6,

FIG. 8 is a view similar to FIG. 7 but showing a modification of the invention,

FIG. 9 is a front view of a modification of the invention,

FIG. 10 is a sectional view taken substantially on lines 10—10 of FIG. 9,

FIG. 11 is a perspective view of a large modification of the invention,

FIG. 12 is a sectional view on a reduced scale taken on lines 12—12 of FIG. 11, and FIG. 13 is a diagrammatic view of controls which can be used in whole or in part in each of the above modifications and particularly in that modification shown in FIG. 1.

Before referring specifically to the several figures of the drawing, it may be helpful to note that this invention can be practiced either in small or large toys for operation by miniature engines, can be of moderate size to carry four or more passengers and can be of large size for transportation of cargo and passengers. In each of the modifications, the machines are adapted to carry heavy loads, beyond the capacity of conventional aircraft, in the ground cushion; and can carry less weight at a higher altitude within the ground cushion; and can carry still lighter weight loads in flight removed from a surface for creating a ground cushion due to ground effect pressure rise. However, in each of the applications of the invention to be described in detail below, at least parts of a control system and method of effecting control is utilized and is germaine to all modifications, including toys, intermediate size craft and commercial craft.

Referring in detail to the drawings, and first to FIGS. 1 and 2, the machine comprises air foil sections forming two wing portions generally indicated at 15 and 16. The wing portion 15 is mounted forwardly and below the rear wing portion 16. A pair of sidewalls 18 are suitably connected to the sides of the front wing portion 15 and the rear wing portion 16 by suitable structural members, not shown, to secure the parts and enclose framework, not shown, to support the top and sides of the aircraft. The front wing portion 15 is closed by a floor 20 which supports seats 21, the forward of which being the pilot's seat in this modification. At least part of the upper surface 21 of the wing is of transparent material to afford substantially hemispherical, or more, vision for the pilot. In addition, a side part 22 and an access door 23 can be fabricated of transparent material to further afford vision for the pilot and passengers in the rear seat 21. A control wheel 25 is mounted on a movable post 26 to operate controls to be described in detail hereinbelow in connection with FIG. 13. A pair of foot pedals 27 operate rudders 28 in a conventional manner as practiced in present aircraft and is not described in detail below.

The rear wing portion 16 has a cambered upper surface 30 for creating a low pressure area adjacent thereto and is swept by the slip stream of a propeller 31 driven by an engine 32. The lower part of the slip stream from the propeller 31 is directed beneath a lower surface 34 of the rear wing 16 and the tip path plane of the propeller is preferably faired at the lower sides of intake 50 as by curved extended surfaces 51 extending between sides 18 and the bottom 20 of wing portion 15. A positional stabilizer 35 is, for normal flight, positioned as shown in solid lines in FIGS. 1 and 2 and can be positioned to the dotted line positions 35a, 35b, etc., for slow speed operation in ground effect. An elevator 36, or a pair of same, is provided at the trailing edge of the stabilizer 35 and is positioned by the control stick 26.

A front pair of flaps 38 are arranged as a V-shaped prow and are adapted to be moved about pivots 39 by the pressurized air below the floor 20 of the front portion 15 of the vehicle. With the front flaps 38 extended and the stabilizer 35 moved to the dotted line position 35a, 35b the major portion of the slip stream from the propeller 31 will be entrapped below surfaces of the machine defined by the sides 18, the bottom 20, fairing 51, the front flaps 38, the stabilizer 35 and the elevator 36. Accordingly, the center of gravity C.G., is located substantially in the position shown in the fuel and luggage compartment 40. With the C.G., and the center of lift of the craft in vertical alignment in the area indicated by character C.G., the craft can hover in slow speed movement adjacent the ground in substantially the position indicated in FIG. 2. For desired trim of the craft in such hover condition, the position of the engine 32 can be different than shown and can be lower than indicated in FIGS. 1 and 2. For normally balancing a maximum load in wing portion 15, the engine is preferably positioned rearward of the position shown. However, for best cooling of an air-cooled engine which is preferred, the position indicated for engine 32 is presently considered most favorable.

The present vehicle is adapted for transit over the ground and for this purpose steerable front wheels 42 are provided. The wheels may be turned by a control wheel 25 in the cockpit and will be described further in connection with FIG. 13. Rear wheels 44 are mounted sufficiently rear of the center of gravity of the vehicle to support approximately two-thirds of the weight of the vehicle at rest, and are mounted on extension mechanism not shown, so that they may occupy the dotted line position 44A in contact with the surface 45. With this wheeled structure, the propeller 31 may be turned at relatively slow speed and the vehicle driven down a highway or the like.

The C.G., as mentioned above, is located preferably adjacent the point of the fuel tank so that the amount of fuel carried is of minor concern regarding trim of the vehicle. Accordingly, the remaining problem of trim is the placement of pilot and passengers. It is normally assumed that an average pilot and gear may weigh approximately between 160 to 190 pounds. The mechanism is arranged so that the forward seat can be adjusted somewhat forwardly and rearwardly to accommodate different sizes and weights of pilots. Normally, passengers will occupy the rear seat 21 and will, therefore, shift the center of gravity forwardly from the position C.G., indicated in FIG. 2. Accordingly, this position C.G., is ascertained for minimum load (pilot only) with the stabilizer preferably in the position 35b to present larger ground effect reaction area below rear wing surface 34. Thus, to trim the craft for the full load of passengers the stabilizer 35 can be moved to the position 35a in which the upward forces reacting on the parts below and adjacent the rear wing portion 16 is reduced to trim the craft for low speed ground cushion operation.

For the rearward engine mounting for full load trim, as preferred when the normal usage of the machine is at full load, the center of gravity of the disposable full load is preferably slightly rearward of the center of gravity of the aircraft when same is empty. The stabilizer 35 and elevator 36 will occupy substantially the position 35a for pilot only, and the position 35b for full load. Of course, for variable loads, the stabilizer 35 may be positioned suitably to trim the machine.

For high speed operation, the stabilizer 35 is moved to the position shown in solid lines and the elevators 36 operate to perform normal control elevation functions by exerting aerodynamically created forces during such flight. In high speed flight aerodynamic forces acting upon the vanes 38 will swing same upwardly adjacent the bottom of the floor 20 of the forward wing portion 15. Thus, it is seen that the craft is trim and aerodynamically clean during such flight. The propeller 31 in its swept disk reduces the air pressure on faired portions 48 and 51 at the rear of the front portion 15 of the aircraft to effect boundary layer control at the trailing edges thereof and reduce turbulence of air introduced into faired throats 50 adjacent the sides 18 and below the rear wing 16. Certain retractible means for fairing the throats 50 for low speed ground effect hovering or the like, not shown in this figure, will be explained in connection with modifications to be described in detail below (FIGS. 4 and 5.)

For high speed flight wings 52 having ailerons 53 are extensible to the dotted line position 52a and provide additional wing surface for the vehicle, as well as roll control. Spoilers are provided, and can be operated collectively for pitch control or selectively for roll control, in a manner to be described in detail below in connection with FIG. 13.

The center of lift of the rear wing portion 16 is indicated at the point 55a and the center of lift for the forward wing portion will be approximately at the point 55.

When the two wings are of approximately the same area the resultant lift of the two will occur substantially vertically above the center of gravity C.G. This position also is in substantially vertical alignment with the center of static pressure, mentioned above, for operating the vehicle in ground cushion at relatively slow translatory speeds. The center of lift of the extensible wings 52 is also in transverse alignment with the sum of the lifts of the wing portions 15 and 16 to augment same in substantial alignment therewith to further enable the craft to sustain greater loads and provide additional roll control.

This machine is capable of operating over land, marsh, snow, ice, etc., as well as water on which it may float and, accordingly, is provided with a pair of flotation pontoons 60 forming the lower part of the side walls 18. Only one pontoon is shown in FIG. 1 but other modifications show pontoons in more or less diagrammatic manner hereinbelow.

In operation, the machine described above will have the stabilizer 35 moved to the position shown in broken lines at 35a and 35b. The rear wheels 44 will be extended to the dotted line position 44A and the engine 32 turned to drive the propeller 31 at moderate speed. With the rear wheels lowered the rear of the vehicle will have more ground clearance and the ground effect pressure rise will be substantially reduced because of rapid air flow from beneath the rear of the vehicle. The angle of attack of the wings 15 and 16 of the vehicle is also reduced. Better road performance is thus attained under gusty ambient conditions. For greater ground effect pressure rise the rear wheels 44 are raised.

The thrust of the propeller will urge the aircraft forward or to the left as viewed in these figures. The control wheel 25 can be rotated to turn the front wheels 42 to effect steering during low speed operation. Accordingly, the vehicle can be driven along streets and highways. In the even the craft is in water, the net effect of the slip-stream from the propeller 31 acting on rudders 28 and turning of the wheel simultaneously therewith will effect control. However, for water flight, in engagement with the water, the propeller 31 must turn at higher speed to overcome the frictional drag of the pontoons 60 through water.

After a predetermined velocity in the forward direction is attained, the machine will fly at higher elevations to gain still more speed. At this time the aerodynamic forces will be more effective so that the stabilizer 35 may be moved to the solid position shown in FIG. 2 and the machine will continue at high speed operation and with aerodynamic control to be described in detail hereinbelow.

FIG. 3 shows a modification of the invention consisting of an upepr rear wing 65, a lower forward wing 66, forward flaps 67 at the front of the rear wing are substantially identical to the flaps 38 described above, and sides 70 for securing the upper and lower wings 65 and 66 together and further supporting the extensible wings 72. Hydraulic motors 74, only one of which is shown, act on crank levers 75 to rotate the wings 72 around pivots 76. Such hydraulic operating mechanism as shown in this figure can be adapted to the machine described above for affording operation of auxiliary wings 52 thereof, including the control ailerons 53 which may be operated by cables passing through the pivot 76 in a way similar to that to be described below in connection with FIG. 13 regarding elevator control through a pivoted connection.

Referring now to FIGS. 4 and 5, a machine is shown which has a cabin 94 carried by the upper rear wing 80; the rear wing 80 is connected to a pair of side walls of which at their forward ends are connected to a lower forward wing 83. The forward wing 83 is in part triangularly or delta shaped, not shown, and has beneath its forward edge a pair of flaps 85 which are shown in their extended position. These flaps are hinged at 86 and are connected together with gussets 87 at the center of the prow of wing 83 and to the forward ends of pontoons 90 at the insides thereof. The gussets 87 are conveniently made of rubber, or similar material, and are sufficiently flexible to permit aerostatic and areodynamic forces to move the flaps 85 to extended and retracted positions under the influence of relatively low air forces.

The upper rear wing 80 has an elevator 92 at its trailing edge, that in FIG. 5, is shown in its downwardly deflected position in which it is placed for slow speed areostatic pressure supported operation in the ground cushion. The chain 94 has a transparent hatch 95 and a depending pod 96 secured at the center of and below the wing and behind an engine 98 for driving the propeller 99. The tippath 100 of the propeller 99 is faired by a pair of panels 101 mounted on hinges 102 which may be spring biased to the solid line positions shown wherein their inwardly curved edges 103 are adjacent to the tip path 100 during slow-speed flight. At higher speed flight, relative wind will urge the panels to positions adjacent the insides of the side walls 81 shown at 101a, FIG. 5.

With the construction described above for slow speed flight, the air in the slip stream from the propeller 99 will be directed beneath the upper rear wing 80 between side walls 81, beneath the lower forward wing 83, pontoons 90, behind the flaps 85 and the panels 101, and the elevator 92. The center of lift under these static conditions will be at approximately the position 105. Accordingly, this modification of the invention is designed to maintain the machine in trim with the pilot in the rear seat, indicated at 106. Of course, this is not essential and could be different within the scope of the invention. In this modification, as in the modifications described above, the elevator 92 can be positioned differently than shown to effect greater area reacted on by underlying air pressure for supporting and trimming the machine on a ground cushion.

The aerodynamic center of lift 108 of the upper rear wing 80 is substantially at the position indicated at approximately 30% of the wing chord. The forward wing being triangularly or "delta" shaped has a center of lift approximately at point 109. Because the area of the forward wing is substantially less than the area of the upper wing 80, the resultant center of lift will be substantially in registry with the center of gravity 105 to thereby stabilize the machine in high speed flight about said center of gravity and center of lift. If desired, the elevator 92 can be equipped with a stabilizer as in FIGS. 1 and 2 to effect aerodynamic and aerostatic trim for compensating for different weights of passengers, or the like. It is also preferred, but not essential, that the fuel tank 110 be located in vertical alignment with the center of gravity so as not to affect center of gravity change due to fuel consumption.

The machine shown in FIGS. 4 and 5 is controlled in heading by a stabilizer 112 provided with rudders 113 operated in conventional manner by foot pedals not shown. This machine can be controlled by a portion of the control system to be described more in detail below in connection with FIG. 13, and spoilers 114 can provide pitch and roll control.

Referring now to FIGS. 6 and 7, a modification of the device is shown incorporating a pair of propellers. An upper rear wing portion 115 is connected by side walls 116 with a lower forward wing portion 118. A pair of pontoons 119 are provided at the lower edges of the side walls 116 to provide flotation for the machine. Steerable front wheels 120 are shown, as well as supporting rear wheels 121, the latter of which may be extensible as shown at 121a, FIG. 7 for road travel. A faired partition 125 connects the leading edge of the upper rear wing 115 with the lower front wing 118 and provides faired inlet ducts 127 in which propellers 128 are turned by one or more engines 130, suitably supported, not shown, as by the upper wing. It is preferred that the propellers 128 turn in opposite directions of rotation whereby to minimize adverse reactions due to torque and gyroscopic effects of the propellers. The slip steam from the propellers 128 is shown as deflected by turning vanes 132 which turn the air substantially downwardly. These vanes 132 also serve to straighten the air leaving the propellers 128 and remove turbulence therefrom. In addition, the vanes 132 exert a rearward thrust due to air reacting upon the vanes 132 to partially offset the thrust of the propellers 128.

For zero speed hovering flight elevators 135 are lowered to the solid line position shown, FIG. 7, and air pressure lowered forward valves, or flaps, 136 are turned to the position shown whereby air from the propellers 128 is confined between side walls 116 and pontoons 119, wings 115 and 118, partition 125, elevators 135 and forward flaps 136. In this modification, it is preferred that the static center of lift be positioned a predetermined amount forward of the center of gravity whereby more air can leak out beneath the forward flaps 136. The resultant of forward and rearward forces created by static pressure and the turning vanes 132 may substantially equal the thrust of propellers 128 at a given r.p.m. Accordingly, at a lower r.p.m., the machine will have a reverse effect for backing up same, and at a higher r.p.m., will have a net forward thrust to move same forward, to thereby effect fore and aft control during low speed flight on the ground cushion. For higher speed forward flight the vanes 132 may be retracted, in the manner of Venetian blinds, into a recess 138 as by suitable chains, not shown. In addition, the vanes 132 may be guided at their ends within a pair of grooves 140 or the like located on either side of the inside walls 116 or intermediately by a central strut, not shown.

For high speed flight, the elevators 135 are moved to the dotted line position 135a and the vanes 132 raised into the recess 138. High forward speed will cause the forward flaps 136 to retract upwardly adjacent the bottom surface of the forward wing 118 to minimize drag. Roll control can be afforded by differential movement of the stabilizers 135 and trim for variable loads can be effected by positioning a stabilizer 142 about a pivot 143. Horizontal yaw control is effected by stabilizers 145 and rudders 146. All of these controls can be operated by parts of the control mechanism to be described in detail below in connection with FIG. 13.

FIG. 6 shows the delta forward wing 118 having a center of lift approximately at a point 148. The center of lift 149 of the upper wing will be approximately at one-third of the chord thereof. Because of difference of size of the wings 115 and 118, the net center of lift will lie at approximately the point 150 therebetween. The center of gravity 152 is slightly below the center of aerodynamic lift 150. As mentioned above, the static center of lift lies preferably at a point 153 ahead of the center of gravity and the aerodynamic center of lift to effect hovering flight at a predetermined r.p.m. of the propellers 128.

Referring now to FIG. 8, a modification similar to those described above in connection with FIGS. 1, 2, 3, 4 and 5 is shown provided with modified means for effecting closure of the front and rear valves for controlling the shape and position of the underlying air chamber to control the effectiveness of aerostatic pressure in slow speed flights and aerodynamic pressure due to high speed flight. A rear stabilizer 160 is shown in solid lines in the position to which it is placed for hovering flight. A front valve 161 is shown as including a crank arm 162 connected by a tube, or link, 163 with a lever 165 operated by a handle 166 through a pivot 167. A second link 170 is connected to a crank arm 171 through a pivot 172 for positioning the stabilizer 160. When the handle 166 is moved from the position shown in full lines to the position 166a, the links 163 and 170 will be moved toward the right to rotate cranks 162 and 171 counter clockwise to cause the flaps 161 to be moved upwardly into recesses 175 and the stabilizer 160 to be moved to the dotted line position 160a for high speed forward flight. Control elevators 176 and rudders 177 control the high speed flight in a manner incorporating control structure to be described more in detail hereinbelow.

It will be understood in connection with FIG. 8 that the handle 166 could be replaced by a pair of handles, or the like, each of which could operate the several control mechanisms 160 and 161 separately or conjointly to effect trim or drag or other control functions in the aircraft. This modification differs from the others in that the forward flaps 161 are not aerodynamically actuated but are under control of the operator continuously during hovering and high speed flight and can be used to trim the machine at all times.

Referring now to FIGS. 9 and 10, a craft which is a double wing machine in hovering in ground effects is inherently transformed at high speed flight to substantially a single wing characteristic and is, accordingly, controlled in modified manner.

An upper wing 180 and a lower wing 181 are interconnected by side walls 182 for forming a chamber enclosed at the top and sides thereby. A front flap 184 serves to seal the lower leading edge of the lower front wing 181. A screened air foil shaped front 185 is provided as an extension of the upper surface 187 of the upper wing 180 and the lower portion of the leading edge of the forward wing 181. Accordingly, the upper wing 180 at high speed flights is extended by the boundary layer controlled front portion 185 whereby to effect forward shift of the aerodynamic center of lift under high speed flight conditions. Three propellers 190 are shown and can be suitably faired beneath the upper wings and above the lower wing 181 to induce air through the screen front 185 and expel same below the lower surface 192 of the upper wing 180. The propellers may be separately driven or collectively driven as by an engine 194. It is preferred that the slip stream from the propellers 190 pass through diffusers 195 which preferably straighten out turbulence therein and deliver same into the chamber beneath the machine. The air may bleed out below the lower edges of the machine and particularly through the rear opening beneath an elevator 196. Raising and lowering the elevator 196 can further control the amount of air which bleeds out in this direction and, accordingly, can function to control the forward velocity of the ship in ground effect as well as control its pitch during high speed flight.

In this modification of the invention, the center of lift at high speed flight may be approximately at the point 200 which is at one-third chord of the wing formed by the screened leading edge 185 and the upper wing portion 180. A stabilizer 201 may be positioned on a pivot 202 to trim the craft during flight and modify the attitude control thereof effected by the elevator or elevators 196.

It is noted that the position of the aerodynamic center of lift 200 is moved forward relative to the plan-form center of area as regards the center of pressure of the modifications described hereinabove. In each of the above described modifications, such position of the aerodynamic center of the lift was in vertical alignment with the static pressure center of lift effective during low speed operation in the ground cushion. However, due to the configuration and arrangement of the rear portion of the upper wing 180, FIG. 10, there will be a substantial air velocity at the position of arrows 205 below the lower surface 206 of the wing 180 and the elevator 196. Inasmuch as there is no air, except ambient air, blown over the upper surfaces of the rear portion of the wing 180 and the elevator 196 substantially atmospheric pressure will exist thereover. Due to the high velocity of the air below these trailing portions there will be a relatively lower flow induced pressure. Accordingly, the differential in pressures across these rear portions of the machine will result in a downward pressure reacting thereon which pressure will partially oppose the static pressure exerted upwardly by air charged beneath the machine by the propellers 190.

Because air is discharged along the direction of arrows 205 there will be a net forward pressure reacting against forward extending vanes 184 to propel the machine in a forward direction. In addition, there will be a low pressure area adjacent the exterior of the screen 185 due to the inducement of air flow through the apertures therein to create a low pressure thereon and hence atmospheric pressure acting forwardly on rear facing portions of the machine will urge same in the forward direction. When sufficient speed is attained, the entire craft will raise from the ground, the flaps 184 will retract and high speed flight will be attained substantially as a monoplane. In such flight, the elevators 196 and rudders 208 may be controlled by mechanism to be described hereinbelow.

Referring now to FIGS. 11 and 12, a cargo or passenger carrying machine of high capacity is disclosed. This machine is powered as shown by three engines 210 turning propellers or the like 212 passing the air therefrom through diffuser vanes 214 partially over the top 215 and under the bottom 217 of a wing generally indicated at 218. A forward lower wing 220 is provided with fairings 221 between tip paths of the propellers 212 which urge high velocity air over the rear portions of the wing 220 and into a passage 222. The air passes below the bottom 217 of the upper wing 218. The air is entrapped by a rear valve or valves 225 and a front valve or valves 226, the latter of which may be either manually or aerodynamically operated as pointed out in connection with above described modifications of the invention. The air is entrapped between side pontoons 228, the lower surfaces of wings 218 and 220 and the valves 225 and 226.

In this modification, the center of lift 230 is preferably above the center of gravity of the structure and is the same with relationship to aerostatic lift forces and aerodynamic lift forces. This modifications controls trim requirements for different aerodynamic lift due to differences in loads in the machine by means of an adjustable stabilizer 235 of substantial plan form and preferably of the 00 series aircraft air foil whereby to provide, in normal forward flight, either positive or negative pitch moments, as required. Accordingly, the air foil 235 is mounted on a pivoted bar 237 and may be servo positioned in conventional manner by mechanism (such as shown in FIG. 13) through suitable servos.

The stabilizer 235 is provided with a pair of air foils 245 which may be operated collectively to control pitch and operated differentially to control roll of the aircraft. A pair of vertical stabilizers 247 are shown and can be provided with rudders 248 to control yaw. The two ailerons 245 can have their controls operated through the pivot 237 so that positioning the stabilizer 235 will not effect the character of control of the ailerons 245 but will simply change the pitch position in which they serve to control. All control functions are effected from pilot compartments 246, of which two are shown.

Doors 240 may be provided for access to the interior of the upper rear wing 218. The machine is relativel large and preferably is supported as by water 242. The pontoons 228 and the bottom 217 of the upper wing 218 can contribute to flotation in water. If the machine is to be landed on solid surfaces, the pontoons 228 may be provided with sufficient strength members to support the weight of same and skids or wheeled dollies or the like, could be provided in known manner, if desired.

Referring now in detail to FIG. 13, a diagrammatic steering and control system is shown for use in whole or in part for controlling portions of any of the modifications described hereinabove. A steering column 250 is suitably pivoted on a hinge 252 secured to frame parts of an aircraft, not illustrated, which permits the steering column 250 to be moved forwardly and rearwardly to effect control functions in a manner to be described below. A wheel 254 is mounted on a pivot 255 at the top of the column 250 and has a sheave 256 thereon over which reaches of control cables 258 and 259 are wound and secured to drive the cables by rotating the sheave. The sheave 256 when rotated in clockwise or counterclockwise direction raises and lowers the reaches 258 and 259 depending upon the sense of rotation of the wheel 254. Upon rotation of the wheel 254 in a clockwise direction as indicated by arrow 260, the cable 259 will be drawn upwardly. This cable 259 passes over a sheave 261 through a guide eyelet 262 and is suitably connected at point 263 to a crank arm 264 pivoted along a center line 265. The crank arm 264 will be rotated counterclockwise to rotate an arm 276 suitably connected as by a ball joint to a push rod 267 connected to an arm 269 adapted to turn a wheel 270 in a clockwise direction upon a pivot 271 suitably secured to the framework, not shown. Such motion would cause the vehicle, when in motion upon land, to turn toward the right upon clockwise turning of the wheel 254, in the manner of automobile control.

Also connected with the arm 264 of the bell crank is a second arm 273 connected with cables 274 and 275. The arm 276 at its end is connected with cables 277 and 278. The cables 274 and 277 are directed around sheaves 280 and 281, respectively, connected to the left aileron 283 through control horns 284. For the above described clockwise rotation of the wheel 254, the cable 274 will be moved toward the right and the cable 277 will be moved toward the left adjacent the ends of the crank arms 276 and 273. Such motion will cause clockwise rotation of the left aileron 283 around a pivoted front edge 285 which will lower the aileron to cause clockwise roll of the aircraft.

The cables 275 and 278 are connected to sheaves 287 and 288, respectively. Clockwise motion of the steering wheel 254 will cause the portions of the cables connected to the ends of crank arms 276 and 273 to move toward the left and toward the right, respectively. The ends of these cables are connected to bell crank arms 290 and 291, respectively, which are pivoted on a vertical axis centerline 293. The left-hand motion of the cable 278 will cause the upper crank arm 291 to rotate in a clockwise direction on the pivot 293 to cause rotation of a control horn 295 in a clockwise direction to raise the right spoiler 296 to reduce the lift of the wing, not shown, of the aircraft. Conversely, the right-hand movement of the cable 275 will rotate the bell crank arm 290 in a counterclockwise direction to rotate the control horn 298 in a counterclockwise direction to lower the left spoiler 300 and thus increase the lift of the left-hand side of the wing, not shown.

Clockwise rotation of the wheel 254 as indicated by arrow 260 will also move a cable 302 toward the right which will rotate a crank arm 304 in a counterclockwise direction. The crank arm 304 is connected to crank arms 305 and 306. The crank arm 305 is suitably pivotally connected to a push-pull arm 308 pivotally connected to an arm 310 adapted to rotate a wheel 311 in a clockwise direction around a pivot 312 connected to the aircraft frame, not shown. The amount of this movement will be substantially identical to the amount of movement of the left-hand front wheel 270. Accordingly, the crank arms 264 and 304 can be interconnected by a tension-compression tie rod 315. The wheels 270 and 311 are castered and cambered in known manner, substantially as in automobiles.

The crank arms 305 and 306 are connected with cables 317 and 318, respectively, which in turn pass over sheaves 319 and 320, respectively, to a control horn 323 to effect control of the right aileron 322 in opposite sense to the control effected on the left aileron 285.

The above described clockwise motion of the wheel 254 will effect steering of the wheels 270 and 311, positioning of left and right ailerons in opposite senses, and differential operation of the left and the right spoilers 300 and 296, respectively.

The front spoilers can also be collectively positioned through control cables and in conjunction with positioning of an elevator 325 attached to a stabilizer 326 on pivots 327. Control cables 329 and 330 connected to a control horn 328 pass through guide eyelets 331 and 332, respectively, in alignment with an axis 335 upon which the elevator 326 is mounted on the trailing edge 336 of the aircraft. Forward movement of column 250 will cause the cable 329 to be moved to the rear and the cable 330 to be moved forwardly. Because of their connections to opposite ends of the control horn 328, the elevator 325 will be moved downwardly at its trailing edge to cause a pitch-down moment to be exerted on the aircraft when in flight. Cables 340 and 341 are connected adjacent the center pivot points of bell cranks 290 and 291, respectively. An interconnecting vertical link 343 provides pivot mounts at its ends for the bell cranks 290 and 291 which are moved bodily, respectively, forwardly and rearwardly around an axis 344 in clockwise rotation by a forward movement of the column 250. Such movement will rotate control horns 295 and 298 forwardly at their upper ends and rearwardly at their lower ends to raise both the left and right spoilers to cause a decrease in front wing total lift to provide a pitch-down moment. When the control column is moved toward the rear, opposite movements will be impressed upon cables 329 and 330, 340 and 341 to raise the rear edge of the elevator and lower the left and right spoilers to increase the lift of the wing and provide a pitch-up moment on the aircraft.

The servo operated elevator 326 is positioned by means of a control horn 350 connecting with cables 351 and 352 which may be moved by a hydraulic servo motor or the like by positioning a control handle 354 located in the cockpit of the aircraft. This structure has not been shown in detail because it is considered conventional to provide hydraulic servo operation to devices of this kind.

The rudder or rudders 360 are preferably controlled in conventional manner through a control horn 361 and cables 362 and 363 suitably connected with foot pedals 364 and 365, respectively, mounted on the floor of the aircraft in the cockpit thereof.

It is to be understood that this control system could be adapted to dual control in known manner inasmuch as there are only four primary control cables adjacent the pivot 261 of the control column. It is further to be understood that for large craft hydraulic assist devices can be incorporated within the teachings of the invention. It is further to be noted that each one of the craft in the modifications disclosed above does not necessarily require the complete control system as described in connection with FIG. 13. In addition, it is to be understood that in toy devices controls may be effected through G-string connections, or they may be manually positioned prior to flight for free flight.

While I have shown and described in detail certain modifications of the invention, obviously other modifications and adaptations thereof will occur to others skilled in the art. Accordingly, I wish not to be limited in my invention, only to the specific embodiments shown and described but by the scope of the subjoined claims.

I claim:
1. Aircraft for flying over and adjacent a surface on a cushion of pressurized air supplied beneath same thereby comprising, in combination; an upper wing set at a first predetermined angle of attack and having depending ends forming side walls of the aircraft, a lower wing spaced forwardly of said upper wing and being joined with said side walls, said lower wing having a second predetermined angle of attack less than said upper wing, said upper and lower wings forming a duct having an exit adjacent said surface and in part under said lower wing, aerodynamically upwardly operated normally downwardly extended vane means underlying the leading edge of said lower wing forming a front lower edge of said duct when extended downwardly, at least one engine-powered propeller having a tip path describing a circle substantially entirely above said lower wing and partially over said upper wing, said propeller being adapted to create thrust for propulsion and provide air into said duct to create said cushion of pressurized air beneath the aircraft, said cushion of air being maintained in part during flight by a jet-air effect acting beneath said upper and lower wings, attitude control means adjacent the trailing edge of said upper wing in the slip-stream of said propeller, means in said aircraft for positioning said attitude control means, means for modifying the shape and effective position of the outlet of said duct for stabilizing said aircraft under different flight conditions, and means for controlling said modifying means.

2. The combination with a flight oriented ground effect machine provided with engine powered propelling means for creating thrust for high speed flight and further supplying a cushion of aerodynamically activated air beneath the machine through a duct formed by upper and lower wing parts having common side walls providing a duct outlet adjacent the ground, said propelling means describing a tip path plane, and normally extended aerodynamically retractable duct inlet sealing means adjacent said tip path plane for fairing same, positionable means connected to at least one part of said duct for modifying the position of said duct outlet with respect to the bottom of said machine, and control means for positioning said positionable means, said positionable means being adapted to maintain the position of the center of reaction of aerodynamically activated air upon surfaces of said machine during low and high speed flight by moving the geometrical center of pressure forward for relatively low speed flight.

3. The combination with a flight oriented ground effect machine provided with engine powered propelling means for creating thrust for high speed flight and further supplying a cushion of aerodynamically activated air beneath the machine through a duct formed by upper and lower wing parts having common side walls providing a duct outlet adjacent the ground, said propelling means describing a tip path plane, and normally extended aerodynamically retractbale duct inlet sealing means adjacent said tip path plane for fairing same, positionable means connected to at least one part of said duct for modifying the position of said duct outlet with respect to the bottom of said machine, extensible flap means underlying the leading edge of said lower wing parts for forming a portion of said duct outlet, and control means for positioning said positionable means, said positionable means being adapted to maintain the position of the center of reaction of aerodynamically activated air upon surfaces of said machine during low and high speed flight by moving the geometrical center of pressure forward for relatively low speed flight.

4. The combination with a flight oriented ground effect machine provided with engine powered propelling means for creating thrust for high speed flight and further supplying a cushion of aerodynamically activated air beneath the machine through a duct formed by upper and lower wing parts having common side walls providing a duct outlet adjacent the ground, of positionable means connected to at least one part of said duct for modifying the shape and position of said duct outlet with respect to the bottom of said machine, and control means for positioning said positionable means, said positionable means being adapted to change the area and maintain the position of the center of reaction of aerodynamically activated air upon surfaces of said machine during low and high speed flight by reducing the area of reaction for relatively low speed flight, extensible flap means underlying the leading edge of said lower wing part for forming a portion of said duct outlet, said flap means being normally downwardly extending and being aerodynamically retracted during relatively high speed flight, said propelling means describing a tip path plane, and normally extended aerodynamically retractable duct inlet sealing means adjacent said tip path plane for fairing same.

5. Aircraft for flying over and adjacent a surface on a cushion of pressurized air supplied beneath same thereby comprising, in combination; an upper wing set at a first predetermined angle of attack and having depending ends forming side walls of the aircraft, a lower wing spaced forwardly of said upper wing and being joined with said side walls, said lower wing having a second predetermined angle of attack less than said upper wing, said upper and lower wings forming a duct having an exit adjacent said surface and in part under said lower wing, aerodynamically upwardly operated normally downwardly extended vane means underlying the leading edge of said lower wing forming a front lower edge of said duct when extended downwardly, at least one engine-powered propeller having a tip path describing a circle substantially entirely above said lower wing and partially over said upper wing, normally extended aerodynamically retracted duct inlet fairing means adjacent the tip path of said propeller, said propeller being adapted to create thrust for propulsion and provide air into said duct to create said cushion of pressurized air beneath the aircraft, said cushion of air being maintained in part during flight by a jet-air effect acting beneath said upper and lower wings, attitude control means adjacent the trailing edge of said upper wing in the slip-stream of said propeller, means in said aircraft for positioning said attitude control means, means for modifying the shape and effective position of the outlet of said duct for stabilizing said aircraft under different flight conditions, and means for controlling said modifying means.

References Cited

UNITED STATES PATENTS

| | | |
|---|---|---|
| 2,364,676 | 12/1944 | Warner. |
| 2,364,677 | 12/1944 | Warner. |
| 2,387,627 | 10/1945 | Warner. |
| 2,412,647 | 12/1946 | Northrup _____ 244—35 X |
| 2,444,318 | 6/1948 | Warner. |
| 2,940,688 | 6/1960 | Bland _____ 244—36 |
| 3,025,022 | 3/1962 | Girard _____ 244—35 X |
| 3,029,042 | 4/1962 | Martin _____ 244—36 |
| 3,078,940 | 2/1963 | Rolle _____ 114—67 |
| 3,082,976 | 3/1963 | Dornier _____ 114—67 |
| 3,126,171 | 3/1964 | Stepniewski _____ 244—12 |

A. HARRY LEVY, *Primary Examiner.*

MILTON BUCHLER, *Examiner.*

M. A. KLEIN, *Assistant Examiner.*